United States Patent
Easter et al.

(10) Patent No.: US 9,944,021 B2
(45) Date of Patent: Apr. 17, 2018

(54) ADDITIVE MANUFACTURING 3D PRINTING OF ADVANCED CERAMICS

(71) Applicant: Dynamic Material Systems, LLC, Oviedo, FL (US)

(72) Inventors: William Easter, Chuluota, FL (US); Arnold Hill, Orlando, FL (US)

(73) Assignee: Dynamic Material Systems, LLC, Oviedo, FL (US)

(*) Notice: Subject to any disclaimer, the term of this patent is extended or adjusted under 35 U.S.C. 154(b) by 75 days.

(21) Appl. No.: 15/274,899

(22) Filed: Sep. 23, 2016

(65) Prior Publication Data

US 2017/0008236 A1    Jan. 12, 2017

Related U.S. Application Data

(60) Continuation-in-part of application No. 14/858,096, filed on Sep. 18, 2015, now Pat. No. 9,764,987, and
(Continued)

(51) Int. Cl.
*B29C 64/106* (2017.01)
*B29C 64/153* (2017.01)
(Continued)

(52) U.S. Cl.
CPC ........ *B29C 67/0081* (2013.01); *B22F 3/1055* (2013.01); *B23K 26/0006* (2013.01); *B23K 26/342* (2015.10); *B28B 1/001* (2013.01); *B29C 64/106* (2017.08); *B29C 64/153* (2017.08); *B29C 64/165* (2017.08); *B33Y 10/00* (2014.12);
(Continued)

(58) Field of Classification Search
None
See application file for complete search history.

(56) References Cited

U.S. PATENT DOCUMENTS 5,204,124 A    4/1993 Secretan et al.
5,221,294 A    6/1993 Carman
(Continued)

FOREIGN PATENT DOCUMENTS

JP    2006076822    3/2006
WO    2015023612    2/2015

OTHER PUBLICATIONS

Easter, Dynamic Material Systems, LLC, PCT Application No. PCT/US2016/053518 filed Sep. 23, 2016, Notification of Transmittal of International Search Report and the Written Opinion dated Dec. 28, 2016, 15 pages.
(Continued)

*Primary Examiner* — Mary Lynn F Theisen
(74) *Attorney, Agent, or Firm* — Brian S. Steinberger; Law Offices of Brian S. Steinberger, P.A.

(57) ABSTRACT

Methods, processes, systems, devices and apparatus are provided for additive manufacture resulting in the 3D printing of novel ceramic composites. Additive manufacture or 3D printing of bulk ceramic and ceramic composite components occurs at considerably lower temperatures and shorter manufacturing intervals than the current state of the art. The methods, processes, systems, devices and apparatus and selection of precursor resins produce ceramic and ceramic composite material systems which have not been produced before by 3D printing.

20 Claims, 5 Drawing Sheets

Related U.S. Application Data a continuation-in-part of application No. 14/598,658, filed on Jan. 16, 2015, now Pat. No. 9,434,653, which is a division of application No. 13/775,594, filed on Feb. 25, 2013, now Pat. No. 8,961,840.

(60) Provisional application No. 62/232,033, filed on Sep. 24, 2015, provisional application No. 62/053,479, filed on Sep. 22, 2014, provisional application No. 61/606,007, filed on Mar. 2, 2012.

(51) Int. Cl.

| | |
|---|---|
| B29C 64/165 | (2017.01) |
| B28B 1/00 | (2006.01) |
| B22F 3/105 | (2006.01) |
| B33Y 10/00 | (2015.01) |
| B33Y 70/00 | (2015.01) |
| B29C 67/00 | (2017.01) |
| B23K 26/342 | (2014.01) |
| B23K 26/00 | (2014.01) |
| C04B 35/56 | (2006.01) |
| C04B 35/571 | (2006.01) |
| C04B 35/589 | (2006.01) |
| C04B 35/626 | (2006.01) |
| C04B 38/00 | (2006.01) |
| C10M 159/00 | (2006.01) |
| C04B 35/01 | (2006.01) |
| C04B 35/52 | (2006.01) |
| C04B 35/532 | (2006.01) |
| C04B 35/58 | (2006.01) |
| C04B 35/634 | (2006.01) |
| C22C 29/00 | (2006.01) |
| B23K 103/00 | (2006.01) |
| B23K 103/18 | (2006.01) |
| B23K 103/16 | (2006.01) |
| B23K 103/08 | (2006.01) |
| B23K 103/02 | (2006.01) |
| C04B 111/00 | (2006.01) |

(52) U.S. Cl.
CPC .......... *C04B 35/01* (2013.01); *C04B 35/522* (2013.01); *C04B 35/532* (2013.01); *C04B 35/56* (2013.01); *C04B 35/5603* (2013.01); *C04B 35/571* (2013.01); *C04B 35/58* (2013.01); *C04B 35/589* (2013.01); *C04B 35/58085* (2013.01); *C04B 35/6269* (2013.01); *C04B 35/62695* (2013.01); *C04B 35/634* (2013.01); *C04B 38/008* (2013.01); *C10M 159/00* (2013.01); *C22C 29/00* (2013.01); *B23K 2203/02* (2013.01); *B23K 2203/08* (2013.01); *B23K 2203/16* (2013.01); *B23K 2203/18* (2013.01); *B23K 2203/42* (2015.10); *B23K 2203/52* (2015.10); *C04B 2111/00181* (2013.01); *C04B 2235/32* (2013.01); *C04B 2235/3817* (2013.01); *C04B 2235/3852* (2013.01); *C04B 2235/3891* (2013.01); *C04B 2235/425* (2013.01); *C04B 2235/427* (2013.01); *C04B 2235/483* (2013.01); *C04B 2235/5248* (2013.01); *C04B 2235/5264* (2013.01); *C04B 2235/5288* (2013.01); *C04B 2235/602* (2013.01); *C04B 2235/6026* (2013.01); *C04B 2235/6028* (2013.01); *C04B 2235/95* (2013.01)

(56) References Cited

U.S. PATENT DOCUMENTS

| | | |
|---|---|---|
| 5,431,967 A | 7/1995 | Manthiram |
| 5,632,834 A | 5/1997 | Ostertag |
| 5,976,454 A | 11/1999 | Sterzel |
| 6,153,547 A | 11/2000 | Sterzel |
| 6,228,437 B1 * | 5/2001 | Schmidt ............... C04B 41/009 427/243 |
| 6,521,246 B2 | 2/2003 | Sapieszko |
| 6,680,013 B1 | 1/2004 | Stein |
| 8,119,057 B2 | 2/2012 | Fei |
| 8,293,048 B2 | 10/2012 | Fei |
| 8,961,840 B1 | 2/2015 | Hill |
| 9,434,653 B1 | 9/2016 | Hill |
| 2002/0140137 A1 | 10/2002 | Sapieszko |
| 2004/0048731 A1 | 3/2004 | Kim |
| 2004/0138046 A1 | 7/2004 | Sherwood, Jr. |
| 2005/0036931 A1 | 2/2005 | Garcia |
| 2005/0079086 A1 | 4/2005 | Farr |
| 2005/0087903 A1 | 4/2005 | Farr |
| 2006/0069176 A1 | 3/2006 | Bowman |
| 2006/0225834 A1 | 10/2006 | Medina et al. |
| 2010/0038807 A1 | 2/2010 | Brodkin et al. |
| 2011/0319252 A1 | 12/2011 | Schmidt |
| 2012/0178618 A1 | 7/2012 | Vinu |
| 2012/0234681 A1 | 9/2012 | Lomasney |
| 2013/0216420 A1 | 8/2013 | Li et al. |
| 2014/0202125 A1 | 7/2014 | Kobashi |
| 2014/0274658 A1 | 9/2014 | Sherwood |
| 2016/0052162 A1 * | 2/2016 | Colin ............... A61L 27/42 433/201.1 |

OTHER PUBLICATIONS

Easter, William, Dynamic Material Systems, LLC, PCT Patent Application No. PCT/US 16/53518 filed Sep. 23, 2016, Notification of Transmittal of the International Search Report and the Written Opinion of the International Searching Authority or the Declaration dated May 18, 2017, 11 pages.

Colombo, et al., Polymer-Derived Ceramics: 40 Years of Research and Innovation in Advanced Ceramics, J. Am. Ceram. Soc., 2010, pp. 1805-1837, vol. 93, No. 7.

Ye, et al., Ceramic Microparticles and Capsules via Microfluidic Processing of a Preceramic Polymer, J. R. Soc. Interface, 2010, pp. 1-13.

Kleebe, et al., Decomposition-Crystallization of Polymer-Derived Si—C—N Ceramics, Journal of the American Society, 1998, pp. 2971-2977, vol. 81, No. 11.

Kroke, Edwin, et al., Silzane Derived Ceramics and Related Materials, Reports: A Review Journal, 2000, pp. 97-199, vol. 26.

Riedel, R. et al., Synthesis of Dense Silicon-Based Ceramics at low Temperatures, Nature, 1992, pp. 714-717, vol. 355.

Riedel, R. et al., Polymer-Derived Si-Based Bulk Ceramics, Part I: Preparation, Processing and Properties, Journal of the European Ceramic Society, 1995, pp. 703-715,, vol. 15.

Konetschny, Christoph et al., Dense Silicon Carbonitride Ceramics by Pyrolysis of Cross-linked and Warm Pressed Polysilazane Powders, Journal of the European Ceramic Society, 1999, pp. 2789-2796, vol. 19.

Greil, Peter, Polymer Derived Engineering Ceramics, Advanced Engineering Materials, 2000, 339-348, vol. 2, No. 6.

Liew, Li-Anne et al., Fabrication of SiCN Ceramic MEMS Using Injectable Polymer-Precursor Technique, Elsevier Science, 2001, pp. 64-70, vol. 89.

Shah, Sandeep R. et al., Mechanical Properties of a Fully Dense Polymer Derived Ceramic Made by a novel Pressure Casting Process, Acta Materialia, 2002, pp. 4093-4103, vol. 50.

Harshe, Rahul et al., Amorphous Si(Al)OC Ceramic from Polysiloxanes: Bulk Ceramic Processing, Crystalization Behavior

(56) References Cited

OTHER PUBLICATIONS and Applications, Institute of Materials Science, 2004, pp. 3471-3482, vol. 24.

* cited by examiner

ADDITIVE MANUFACTURING 3D PRINTING OF ADVANCED CERAMICS

CROSS REFERENCE TO RELATED APPLICATIONS

This application claims the benefit of priority to U.S. Provisional Patent Application Ser. No. 62/232,033, filed Sep. 24, 2015, and this application is a Continuation-In-Part of U.S. patent application Ser. No. 14/858,096 filed Sep. 18, 2015, which claims the benefit of priority to U.S. Provisional Patent Application Ser. No. 62/053,479 filed Sep. 22, 2014, which is a Continuation-In-Part of U.S. patent application Ser. No. 14/598,658 filed Jan. 16, 2015, now U.S. Pat. No. 9,434,653, which is a Divisional of U.S. patent application Ser. No. 13/775,594 filed Feb. 25, 2013, now U.S. Pat. No. 8,961,840, which claims the benefit of priority to U.S. Provisional Patent Application Ser. No. 61/606,007 filed Mar. 2, 2012. The entire disclosure of each of the applications listed in this paragraph are incorporated herein by specific reference thereto.

FIELD OF THE INVENTION

This invention relates to additive manufacturing, also known as, 3D printing of advanced ceramics, and in particular to methods, processes, systems, devices and apparatus for manufacturing bulk ceramic composites.

BACKGROUND AND PRIOR ART

Additive Manufacturing or 3D printing of ceramics or ceramic composites is in its infancy. Due to the high temperature requirements and the difficulties of using bulk ceramic precursors, additive manufacturing of ceramics is not as well developed as the 3D printing of metals and polymers which are easier to cast, mold or machine into various shapes and sizes.

The issues with Polymer Derived Ceramics have historically been that "the polymer to ceramic conversion occurs with gas release which typically leads to cracks or pores which make the direct conversion of a preceramic part to dense ceramic virtually unachievable unless its dimension is typically below a few hundred micrometers (as in the case of fibers, coatings, or foams.) *J. Am. Ceram. Soc.* 93 [7] p. 1811 (2010). Commonly owned, U.S. Pat. No. 8,961,840 is incorporated herein by reference, is related to the present invention and solves the problem of making a direct conversion of a preceramic part (green body) to a dense, monolithic ceramic without cracks or pores traditionally caused by gas release during pyrolysis.

There are a couple of techniques that are currently used in commercial applications. One is the technique used by Robocasting Enterprises where a ceramic slurry is squeezed out of an applicator similar to the application of toothpaste to a toothbrush. The deposition pattern is controlled by a 3D CAD file to produce an initial green body which then must be heat treated at very high temperatures to densify to the final ceramic. Ceramics made with the robocasting technique include traditional ceramics such as alumina, zirconia, silicon nitride, and silicon carbide.

Another technology is one that is represented by 3DCeram where high viscosity, ultra violet (UV) light curable materials, in paste form are used. These photocurable resin compounds containing ceramic powders are laid down in a manner such that a laser that is controlled by a 3D CAD file can polymerize the pastes. Then, another ceramic-UV curable paste layer is laid down on top of the previous layer followed by another laser treatment controlled by the 3D CAD file. This process is repeated until the final 3D shape is obtained. The parts are then heat treated for the purpose of debinding the photocurable resin and then sintering the ceramic particles in order to eliminate the resin and densify the ceramic. Again, extreme temperatures in excess of 1600° C. for long intervals are required to sinter the ceramics together. This high temperature process is very energy intensive, thus very expensive, and limits the composites that can be made with these techniques due to the temperatures required to sinter ceramics being generally higher than the melting temperature of most metals.

A recent advancement in additive manufacturing or 3D printing of ceramics or ceramic composites is reported by Zak E. Eckel et al. in *Science*, "Additive manufacturing of polymer-derived ceramics," 1 Jan. 2016, Vol. 351, Issue 6268, sciencemag.org with Supplementary Materials at www.sciencemag.org/content/351/6268/58/suppl/DC1. Eckel et al. teach the fabrication of fully dense ceramic structures with no porosity or surface cracks in intricate shapes, such as, rib, corkscrew, lattice and honeycomb, using ultraviolet (UV) light curable liquid polymer resins, exposing the liquid resin to UV light through a patterned mask using self-propagating photopolymer wave-guide technology (SPPW) to rapidly create structures 100 to 1000 times more rapidly than with traditional layering. The architecture of the structure is defined by a patterned mask that defines the areas exposed to a collimated UV light source. To avoid shattering on pyrolysis, the printed polymer structure is typically limited to fine features with less than approximately 3 mm in thickness in one dimension. The size limitations of the structure are a drawback.

Thus, another additive manufacturing/3D printing technique is needed to create solid, monolithic, bulk ceramic composite structures for aerospace, propulsion and other high performance applications. Polymer Derived Ceramics (PDCs) of the present invention provide highly desirable bulk ceramic and ceramic composites in much lower temperature ranges without the need for sintering of previously made ceramic particles.

SUMMARY OF THE INVENTION

A primary objective of this invention is to provide methods, processes, systems, devices and apparatus to additively manufacture or 3D print bulk ceramic and ceramic composite components at considerably lower temperatures and shorter manufacturing intervals than the current state of the art.

A secondary objective of this invention is to provide methods, processes, systems, devices and apparatus to produce ceramic and ceramic composite material systems which have not been produced before by 3D printing.

A third objective of this invention is to provide methods, processes, systems, devices and apparatus to prepare a green body component starting with resin beads mixed with or without metallic powder, layered, deposited in a bed and photocured.

A fourth objective of this invention is to provide methods, processes, systems, devices and apparatus to prepare a green body component starting with resin beads wet with a photocurable or thermally curable resin, layered, and cured to form a green body.

A fifth objective of this invention is to provide methods, processes, systems, devices and apparatus to prepare a green body component starting with resin beads mixed into a paste or gel, with or without metal powder, carbide powder, ceramic powder, or mixtures thereof, loading the paste or gel into computer controlled syringes, depositing layers of the paste or gel, curing each layer with UV or IR radiation to form a green body.

A sixth objective of this invention is to provide methods, processes, systems, devices and apparatus to prepare a ceramic/metallic composite starting with resin beads that are converted to spherical ceramic beads, mixed with an active brazing alloy paste to form a spreadable slurry with or without metal powder, carbide powder, ceramic powder, or mixtures thereof, wherein the spreadable slurry is processed by Selective Laser Melting (SLM) techniques to produce ceramic/metallic composite components.

A seventh objective of this invention is to provide methods, processes, systems, devices and apparatus to prepare a ceramic/metallic composite starting with resin beads that are converted to spherical ceramic beads, mixed with pastes made with glass powders to form a spreadable slurry with or without metal powder, carbide powder, ceramic powder, or mixtures thereof, wherein the spreadable slurry is processed by Selective Laser Melting (SLM) techniques to produce ceramic/metallic composite components.

A process for forming a finished green body component, in an additive manufacturing system wherein the green body is converted to a bulk, monolithic ceramic composite, can include the steps of selecting a precursor resin, converting the precursor resin to beads, blending the precursor resin beads with a powder selected from at least one of a metal powder, a carbide powder, a ceramic powder and a mixture thereof, depositing a plurality of layers of the polymer precursor resin and powder blend in a bed, spraying each layer with photocurable or thermally curable resins, heating the layers and the entire bead bed with ultraviolet or infrared radiation to cure the resin mixture and form a finished green body component, removing the finished green body component to a furnace to convert the green body to a ceramic composite having a thickness in a depth dimension in a range between approximately 200 microns and approximately 25 millimeters (mm).

The step of depositing of the plurality of layers of the polymer precursor resin and powder blend can be computer controlled. The precursor resin can be selected from one of a liquid resin and a multiple of different precursor resins. The precursor resin can be enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

A process for forming a finished green body component, in an additive manufacturing system wherein the green body is converted to a ceramic composite, can include the steps of selecting a precursor resin, converting the precursor resin to beads, pre-wetting the precursor resin beads with a photocurable or a thermally curable resin, spreading the pre-wet beads in a plurality of layers, curing the layers or the entire bead bed with computer directed ultraviolet or infrared radiation to cure the resin and form a finished green body component, and removing the finished green body component to a furnace to convert the green body to a ceramic composite.

The precursor resin can be selected from one of a liquid resin and a multiple of different precursor resins.

The precursor resin can be enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

A process for forming a finished green body component, in an additive manufacturing system wherein the green body is converted to a ceramic composite, can include the steps of selecting a precursor resin, converting the precursor resin to beads, making a paste or gel by mixing the precursor resin beads with a liquid pre-ceramic polymer which is selected from one of a photo curable or a thermally curable polymer, loading the paste or gel into computer controlled syringes which would deposit the paste or gel in a plurality of layers on a build surface in a selected pattern, curing each layer by flooding the build chamber with ultraviolet or infrared radiation to cure the resin paste or gel and form a finished green body component, and removing the finished green body component to a furnace to convert the green body to a ceramic composite.

The making of a paste or gel, the paste or gel can be further mixed with a powder selected from at least one of a metal powder, a carbide powder, a ceramic powder and a mixture thereof.

The precursor resin can be enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

A process for forming a finished green body component, in an additive manufacturing system wherein the green body is converted to a ceramic composite, can include the steps of selecting a precursor resin, converting the precursor resin to beads, processing un-bonded individual pre-ceramic polymer beads in a furnace to convert the beads to a plurality of individual spherical ceramic beads, mixing the spherical ceramic beads with a brazing alloy paste to form a spreadable slurry, processing the spreadable slurry via Selective Laser Melting (SLM) techniques to produce ceramic composite components.

The precursor resin can be selected from one of a liquid resin and a multiple of different precursor resins.

The precursor resin can be enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

The spreadable slurry of brazing alloy and spherical ceramic beads can be further mixed with a powder selected from at least one of a metal powder, a carbide powder, a ceramic powder and a mixture thereof.

The processing of the spreadable slurry with Selective Laser Melting (SLM) can produce ceramic-metallic composite components.

A process for forming a finished green body component, in an additive manufacturing system wherein the green body is converted to a ceramic composite, can comprise the steps of selecting a precursor resin, converting the precursor resin to beads, processing un-bonded individual pre-ceramic polymer beads in a furnace to convert the beads to a plurality of individual spherical ceramic beads, mixing the spherical ceramic beads with a glass powder paste to form a spreadable slurry, and processing the spreadable slurry via Selective Laser Melting (SLM) techniques to melt the glass paste, which, on cooling, produces ceramic composite components.

The precursor resin can be selected from one of a liquid resin and a multiple of different precursor resins.

The precursor resin can be enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

The spreadable slurry of glass powder paste and spherical ceramic beads can be further mixed with a powder selected from at least one of a metal powder, a carbide powder, a ceramic powder and a mixture thereof.

The processing of the spreadable slurry with Selective Laser Melting (SLM) can produce ceramic-glass composite components.

Further objects and advantages of this invention will be apparent from the following preferred embodiments which are illustrated schematically in the accompanying drawings.

DESCRIPTION OF THE PREFERRED EMBODIMENTS

Figure 1:
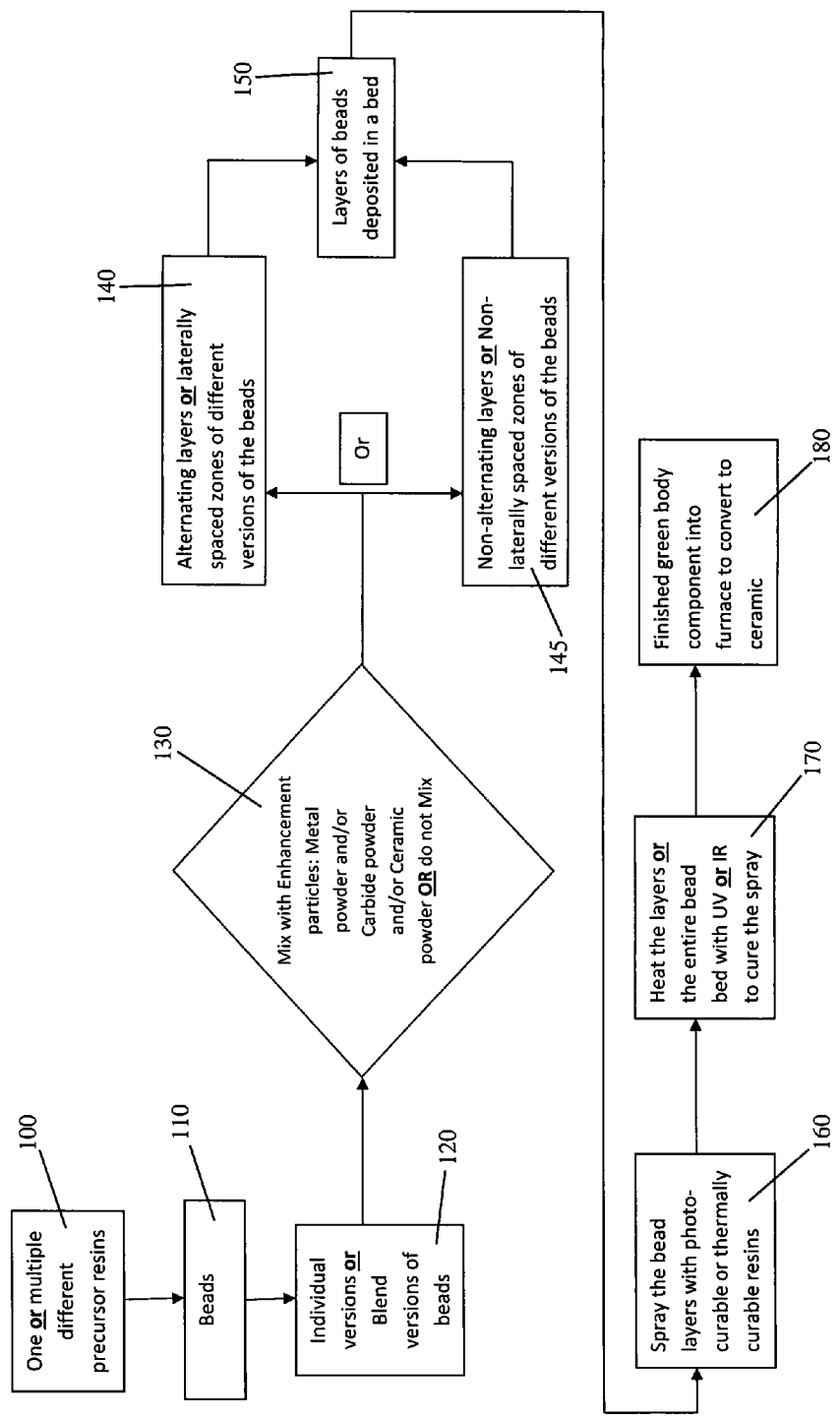
FIG. 1 is a flow chart of the process for preparing a green body component starting with resin beads mixed with or without metallic powder, carbide powder or ceramic powder, layered, deposited in a bed, sprayed with photocurable or thermally curable PDC resins and photocured to form a finished green body component.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The following terms used herein are defined.

The term "approximately" can be +/−10% of the amount referenced. Additionally, preferred amounts and ranges can include the amounts and ranges referenced without the prefix of being approximately.

The term "enhancement particles" is used herein to refer to functional materials that are on the inside or outside of the polymer resin beads used herein. The functional materials include, but are not limited to, at least one of a metallic powder, a ceramic powder, graphite powder, graphene powder, diamond powder, carbide powder, silicide powder, nitride powder, oxide powder, graphene, carbon nanofibers, carbon nanotubes, and mixtures thereof.

The terms "polymer resin beads," "precursor resin beads," "polymer beads" or "beads" are used interchangeably herein to mean polymeric ceramic precursor resin formed in a spherical shape by processes such as, an emulsion process or a spraying process that forms spherical droplets as disclosed in commonly owned U.S. Pat. No. 8,961,840 to Hill et al. and commonly owned U.S. patent application Ser. No. 14/858,096 filed Sep. 24, 2015 to Hill et al. which claims the benefit of priority to U.S. Provisional Patent Application Ser. No. 62/053,479 filed Sep. 22, 2014. The entire disclosure of each of the applications listed in this paragraph are incorporated herein by specific reference thereto.

"3D printing" is three-dimensional printing and is also known as additive manufacturing (AM), refers to processes used to synthesize a three-dimensional object in which successive layers of material are formed under computer control to create an object.

"3D CAD" stands for three-dimensional Computer-Aided Design and refers to software to manipulate data as a digital information source to create three-dimensional objects.

"IR" stands for infrared light which is a form of electromagnetic radiation that is invisible to the eye and in the wave length range between 100 and 400 nanometers (nm).

"UV" stands for ultraviolet light which is electromagnetic radiation that is invisible to the eye and in the wave length range between 800 nm to 1 mm.

The term "bulk" ceramic is used to describe solid, monolithic, fully continuous, thick ceramic structures or objects that are defined by height, width and depth dimensions.

"PDC" stands for polymer derived ceramics wherein polymers are converted into ceramics upon heat treatment.

"SLM" stands for Selected Laser Melting which is an additive manufacturing process that uses 3D CAD data as a digital information source and energy in the form of a high-power laser beam, to create three-dimensional objects. Selective laser melting fully melts the metal into a solid homogeneous mass, unlike selective laser sintering (SLS) which involves binding and fusing parts to create a structure.

Five different techniques for using Polymer-Derived Ceramic resin beads in the 3D printing of bulk structures are disclosed herein. The techniques disclosed reduce manufacturing intervals, reduce manufacturing costs and produce ceramic and ceramic composite material systems which have not been produced before by 3D printing. One of the inventive steps of the present invention is the use of the polymer beads in manufacturing techniques to form a network of porosity that eliminates the destructive effect of out-gassing when processing the layered build-up of the 3D structure. The network of porosity formed by the spherical polymer beads allows non-destructive, non-disruptive gas release during the curing of the ceramic green body by heating, laser, UV or IR radiation. The resulting ceramic composite is a commercially desirable solid, monolithic, bulk ceramic composite structure.

When forming a ceramic composite using the Selective Laser Melting process the precursor polymer beads are pyrolyzed to form spherical ceramic beads before mixing with a brazing alloy paste or a glass paste. Therefore, no outgassing occurs after the beads have been pyrolyzed. The mixtures of beads and paste are arranged in layers and each layer is fused by selectively melting the metallic paste or glass paste in the mixture. The laser energy is intense enough to permit full melting of the particles to form solid metal or glass. The melting process is repeated layer after layer until the part is complete. Commercially desirable solid, monolithic bulk ceramic composite structures are produced.

In the present application, some of the same principles of commonly owned U.S. Pat. No. 8,961,840 to Hill et al., which is incorporated by reference, will be used to additively manufacture or 3D print bulk ceramic and ceramic composite components at considerably lower temperatures and shorter manufacturing intervals than the current state of the art. Incorporated herein by reference are the teachings in commonly owned U.S. Pat. No. 8,961,840 and commonly owned U.S. Provisional Patent Application Ser. No. 62/053,479 filed Sep. 22, 2014, now U.S. patent application Ser. No. 14/848,096 regarding the manufacture of preceramic polymer beads that are useful in the present invention. The entire disclosure of each of the applications listed in this paragraph is incorporated herein by specific reference thereto.

U.S. Pat. No. 8,961,840 to Hill et al. provides for the manufacture of beads made from multiple different precursor resins. Each of these resins gives rise to a different ceramic material.

U.S. patent application Ser. No. 14/858,096 to Hill et al. based on U.S. Provisional Patent Application Ser. No. 62/053,479 provides for the manufacture of a fully dense polymer derived ceramic particle with enhancement particles attached to or incorporated within the structure of the particle to provide unique sizes, compositions, mechanical and chemical properties of the preceramic polymer beads. Examples of the enhancement particles that may be inside or outside the beads include, but are not limited to, functional materials selected from at least one of a metallic powder, a ceramic powder, graphite powder, graphene powder, diamond powder, carbide powder, silicide powder, nitride powder, oxide powder, carbon nanotubes, and mixtures thereof. In terms of the enhancement particles that could be added to each process in the present invention, all of the functional materials listed in commonly owned patents and patent applications can be used in addition to carbon nanofibers and graphene.

U.S. Pat. No. 8,119,057 to Fei et al. includes the work of one of the subject inventors teaching bulk ceramics is also incorporated by reference.

Shape and Size of Ceramic Structures in the Present Invention

Objects can be of almost any shape or geometry that can be accommodated by the 3D printing process. The three-dimensional ceramic structure provided by the present invention wherein the finished green body component is put in a furnace to convert it to a ceramic piece, the resulting ceramic structure is a solid, monolithic piece having a minimum thickness of approximately 200 microns. If the object has a cube shape, the dimensions are approximately 200 microns in height, approximately 200 microns in width and approximately 200 microns in depth. If the shape is a three-dimensional panel, the maximum thickness is approximately 25 millimeters (mm), the maximum height is approximately 1000 millimeters (mm) and the maximum width is approximately 1000 millimeters (mm).

When the Selective Laser Melting (SLM) process is used to form solid structures containing spherical ceramic beads in melted metallic or glass pastes, the size of the monolithic, solid structure produced is only limited by the size of the 3D printer. For example, a solid cube could have the dimensions of approximately 1000 mm×1000 mm×1000 mm. This is possible because there is no need for a furnace.

Thus, the bulk ceramic structures of the present invention can have a three-dimensional size wherein the height is between approximately 200 microns and approximately 1000 millimeters; the width is between approximately 200 microns and approximately 1000 millimeters and the depth or thickness is between approximately 200 microns and 25 millimeters. Currently, the overall size of each monolithic piece is limited by the size of the inkjet printer head and when pyrolysis in a furnace is required, the size of the furnace limits the size of the bulk ceramic piece.

Polymer Beads in Layers with Binder Material Applied to Each Layer.

In FIG. 1, one or multiple different precursor resins 100 are processed to form beads 110, then individual versions of or blends of various beads 120 are mixed with or without enhancement particles, such as, metal powder, carbide powder, ceramic powder and mixtures thereof 130. The beads with or without the powder are spread in alternating layers of or laterally spaced zones of different versions 140 of these polymer resin beads. Alternatively, beads with or without the powder can be spread in non-alternating layers or non-laterally spaced zones 145 of different versions of the beads. The polymer beads are deposited in a bed 150 one layer at a time.

Optionally, metal powders, carbide powders or ceramic powders are blended into the bead layers. The layers are then sprayed 160 with a photocurable or thermally curable liquid ceramic precursor resin made from one or multiple different ceramic precursor resins. That is to say multiple spray heads are used to spray multiple different ceramic precursor resins in different areas of the bead bed. The patterns sprayed onto the bead bed are controlled by the 3D CAD files of the parts to be produced.

After each layer is sprayed, the liquid resin is cured with computer directed UV or IR radiation or alternately the entire bead bed is heated 170 and if the sprayed resins are made thermally curable they will solidify on contact or soon after contact with the hot beads. The result of curing the resin is to bond the individual beads together and to bond each new layer to the previous layer.

Once all of the layers are built up and bonded together the finished green body component is separated from the remaining unbound beads and placed in a furnace where it is converted to a monolithic multi-ceramic component 180. This process allows for the creation of ceramic components that vary in ceramic composition in all three dimensions. It also allows for the creation of a vast number of different compositional/structural combinations.

Polymer Beads Pre-Wet with Photocurable or Thermally Curable Resins.

Figure 2:
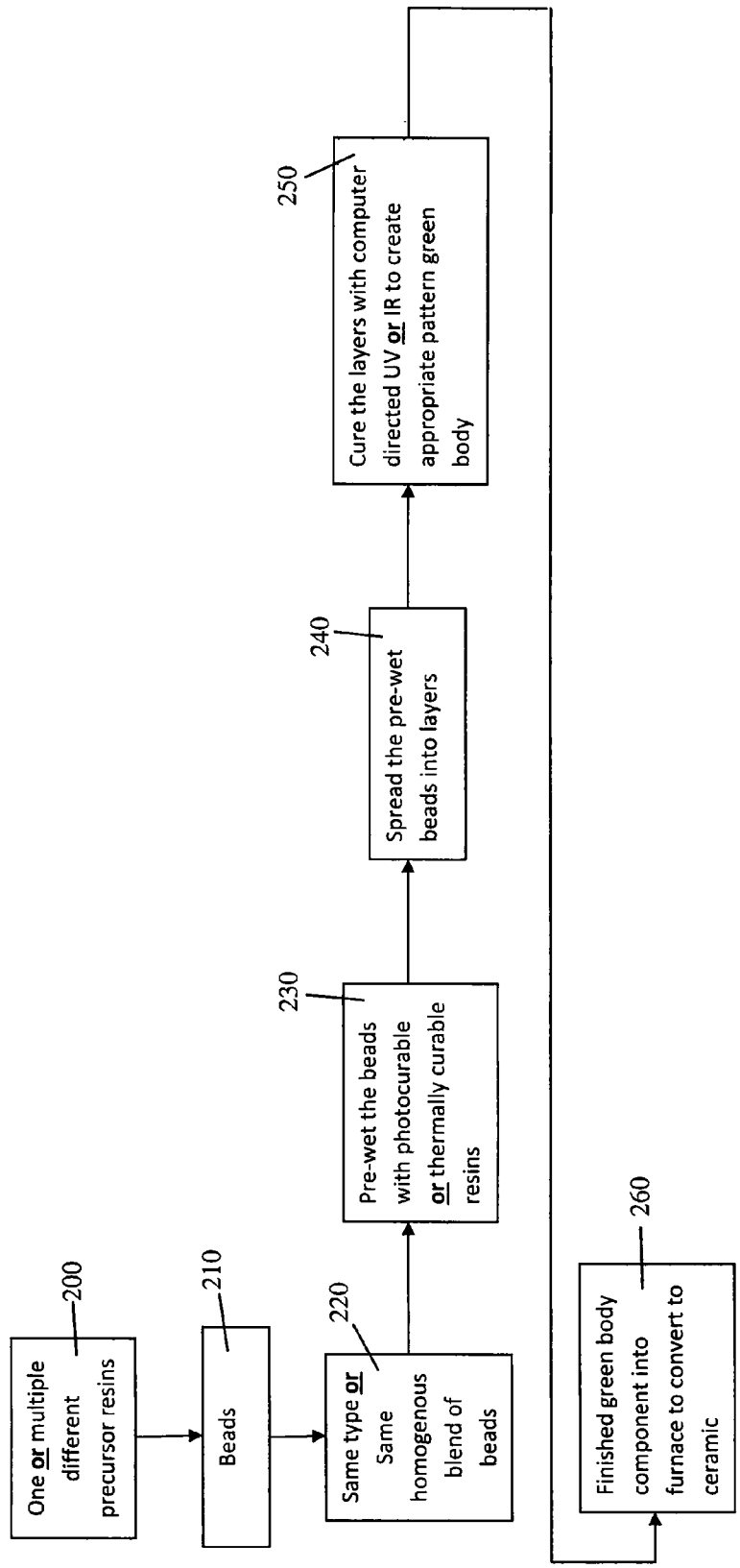
FIG. 2 is a flow chart of a simplified process of FIG. 1 starting with resin beads, wet with a photocurable or thermally curable PDC resin, layered and cured to form a green body.

FIG. 2 is a simpler iteration of the process in FIG. 1. One or multiple different precursor resins 200 are processed to form beads 210. If all of the beads with or without enhancement particles are of the same type or same homogenous blend of types 220, all of the beads could be pre-wetted with photocurable or thermally curable resins 230 and spread out in layers 240 and cured by computer directed ultraviolet (UV) light or infrared (IR) light radiation to create the appropriate pattern of cured green body 250. The finished green body component is placed in a furnace to convert to a monolithic ceramic object 260.

Polymer Beads in a Paste or Gel Deposited Layer by Layer to Build a Structure.

Figure 3:
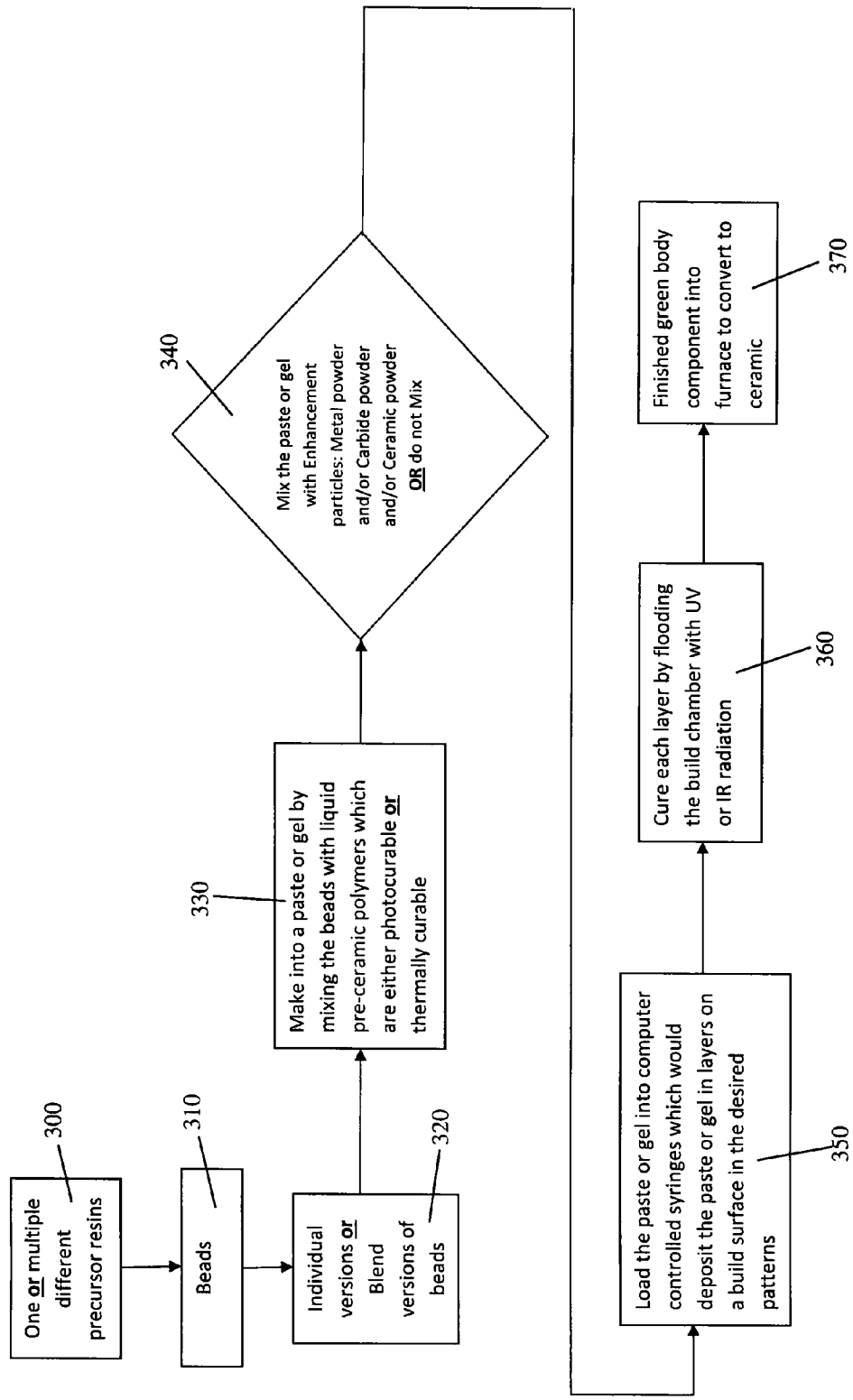
FIG. 3 is a flow chart of a process that requires mixing resin beads with liquid pre-ceramic polymers to make a paste or gel with or without metal powder, carbide powder, ceramic powder, or mixtures thereof, loading the paste or gel into computer controlled syringes, depositing layers of the paste or gel, curing each layer with UV or IR radiation to form a green body.

In FIG. 3, one or multiple different precursor resins 300 are processed to form preceramic polymer beads 310 as described in FIG. 1. Individual versions or blend versions of beads 320 are made into a gel or paste 330 by mixing the beads with liquid preceramic polymers which are either photocurable or thermally curable. Additionally, enhancement particles, such as, metal powders, carbide powders or ceramic powders can be blended into the paste or gel 340. The paste or gel is then loaded into computer controlled syringes 350 which would deposit the paste or gel in layer fashion on a build surface in the desired patterns. Each gel layer is photocured or thermally cured by flooding the build chamber with UV light or IR light radiation or heating the build chamber 360. Multiple syringes depositing multiple different preceramic gels or pastes are used to create multi-ceramic green bodies which are then fired in a furnace 370 to make monolithic multi-ceramic parts. As with FIG. 1, the curing of the liquid resins serves to bond the individual beads together as well as bond each successive layer to the previous layer.

Figure 4:
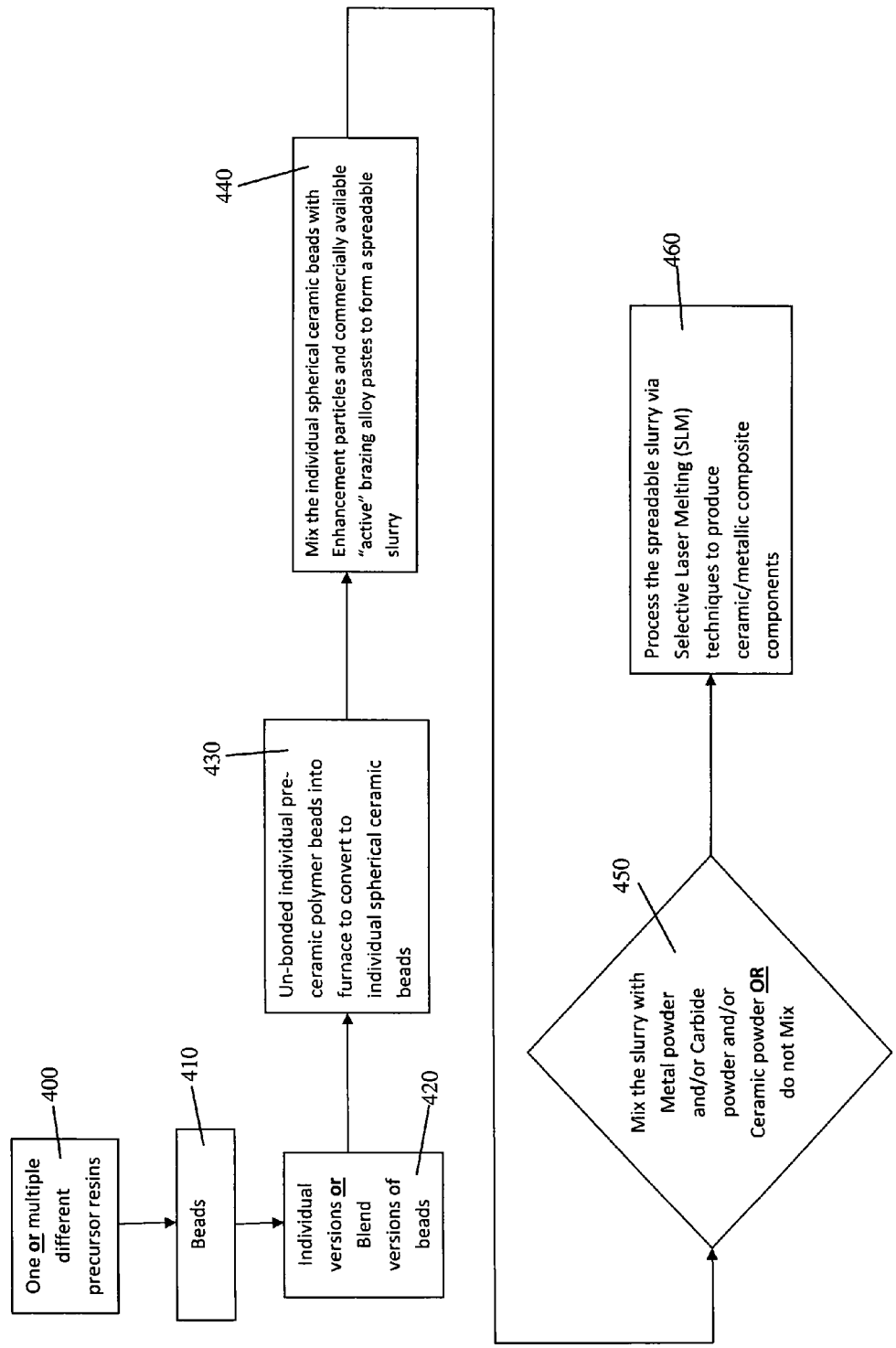
FIG. 4 is a flow chart of a process for preparing a ceramic/metallic composite starting with resin beads that are converted to spherical ceramic beads, mixed with an active brazing alloy paste to form a spreadable slurry with or without metal powder, carbide powder, ceramic powder, or mixtures thereof, wherein the spreadable slurry is processed by Selective Laser Melting (SLM) techniques to produce ceramic/metallic composite components.

Polymer Beads Converted to Spherical Ceramic Beads Mixed with Brazing Alloy Pastes The flow chart in FIG. 4 shows that one or multiple different precursor resins 400 are formed into beads 410, then the individual versions or blend versions of beads 420 are processed to form spherical ceramic beads 430 by firing in a furnace a quantity of un-bonded individual preceramic polymer beads that are described in FIG. 1 and U.S. Pat. No. 8,961,840. Then individual spherical ceramic beads are mixed with enhancement particles and commercially available "active" brazing alloy pastes 440 to form a spreadable slurry. The slurries can also be mixed with metal powders, carbide powders or ceramic powders 450. The slurry with spherical ceramic beads is then processed via Selective Laser Melting (SLM) techniques to produce ceramic/metallic composite components 460.

Alternately, if the proper laser is not available for use, the brazing alloy pastes can be blended with a thermally or photocurable agent then mixed with the ceramic beads to produce a slurry that is processed to form a finished green body ceramic component that is pyrolyzed in a furnace to convert the green body to a monolithic ceramic via heat treatment. The size of the ceramic structure will be limited by the size of the furnace available for pyrolysis; the furnace will melt the brazing alloy producing the ceramic-metallic composite.

Figure 5:
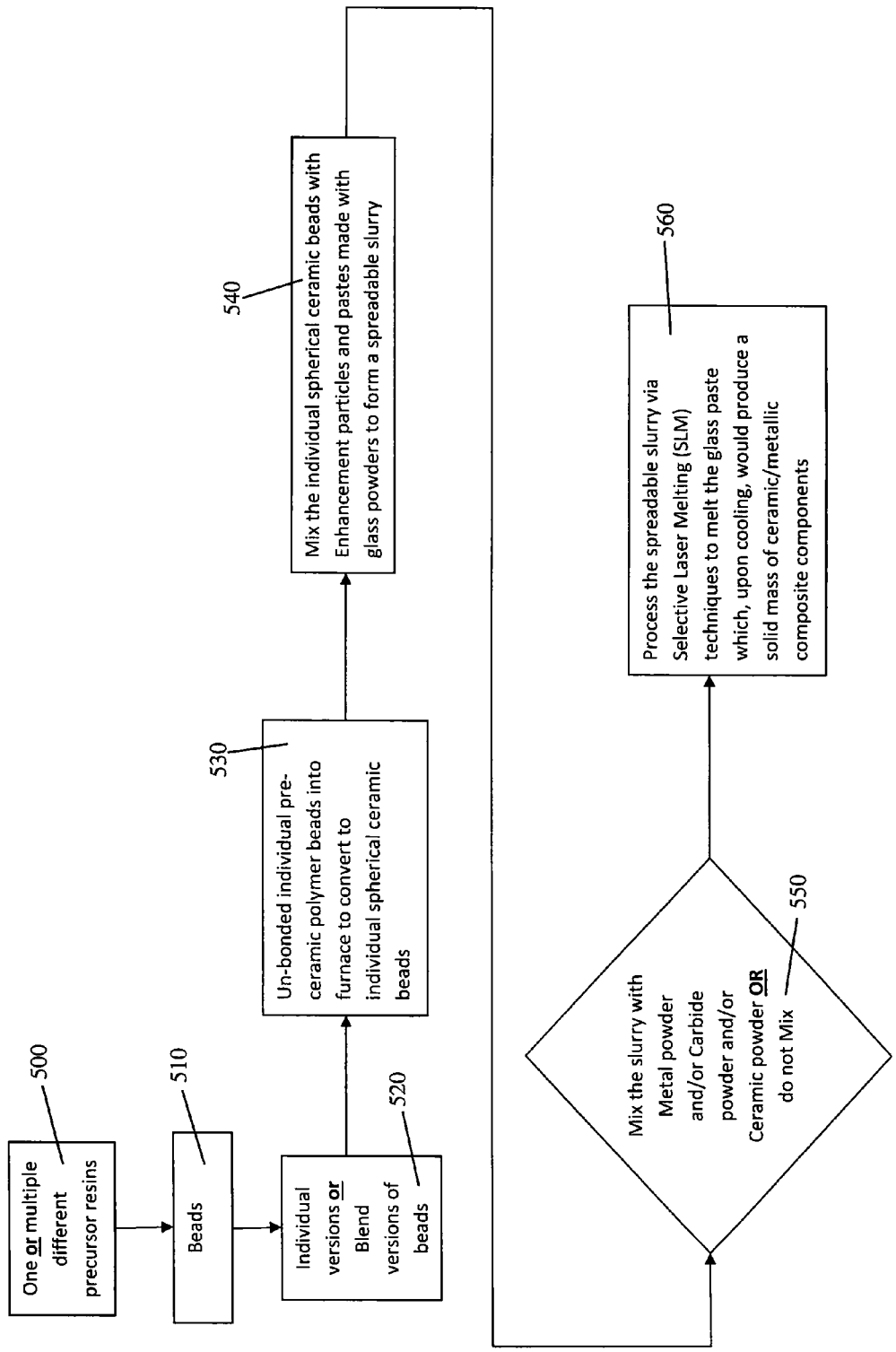
FIG. 5 is a flow chart of a process for preparing a ceramic/metallic composite starting with resin beads that are converted to spherical ceramic beads, mixed with a paste made from glass powders to form a spreadable slurry with or without metal powder, carbide powder, ceramic powder, or mixtures thereof, wherein the spreadable slurry is processed by Selective Laser Melting (SLM) techniques to produce ceramic/metallic composite components.

Polymer Beads Converted to Spherical Ceramic Beads Mixed with Glass Powder Pastes The process shown in FIG. 5 is similar to the process in FIG. 4 in that one or multiple different precursor resins 500 are formed into beads 510, then the individual versions or blend versions of beads 520 are processed to form spherical ceramic beads 530 by firing a quantity of un-bonded ceramic beads in a furnace. However, in FIG. 5, instead of using "active" brazing alloys, pastes made with glass powders 540 are mixed enhancement particles and with the spherical ceramic beads 530 to make the slurries. The slurries may also contain metal powders, carbide powders or ceramic powders 550. To create 3D parts and hermetically seal electronic components using Selective Laser Melting (SLM), the laser melts the glass paste which upon cooling, bonds the ceramic beads and, if present, the metal, carbide, and ceramic powders together forming a ceramic/metallic composite component 560.

Alternately, if the proper laser is not available for use, the glass pastes can be blended with a thermally or photocurable agent then mixed with the ceramic beads to produce a slurry that is processed to form a finished green body ceramic component that is pyrolyzed in a furnace to convert to ceramic. The size of the ceramic structure will be limited by the size of the furnace available for pyrolysis, the furnace will melt the glass paste to produce the ceramic-glass composite.

In summary, compared to the prior art, the present invention solves the problem of making strong, durable quality, monolithic, bulk ceramic structures. Prior to this invention, ceramic 3D structures were considered too brittle and prone to breaking.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A process for forming a finished green body component, in an additive manufacturing system wherein the green body is converted to a bulk, monolithic ceramic composite, comprising the steps of:
   selecting a precursor resin;
   converting the precursor resin to beads;
   blending the precursor resin beads with a powder selected from at least one of a metal powder, a carbide powder, a ceramic powder and a mixture thereof;
   depositing a plurality of layers of the polymer precursor resin and powder blend in a bed;
   spraying each layer with photocurable or thermally curable resins;
   heating the layers and the entire bead bed with ultraviolet or infrared radiation to cure the resin mixture and form a finished green body component; and
   removing the finished green body component to a furnace to convert the green body to a ceramic composite having a thickness in a depth dimension in a range between approximately 200 microns and approximately 25 millimeters (mm).

2. The process of claim 1, wherein the depositing of the plurality of layers of the polymer precursor resin and powder blend is computer controlled.

3. The process of claim 1, wherein the precursor resin is selected from one of a liquid resin and a multiple of different precursor resins.

4. The process of claim 1, wherein the precursor resin is enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

5. A process for forming a finished green body component, in an additive manufacturing system wherein the green body is converted to a ceramic composite, comprising the steps of:
selecting a precursor resin;
converting the precursor resin to beads;
pre-wetting the precursor resin beads with a photocurable or a thermally curable resin;
spreading the pre-wet beads in a plurality of layers;
curing the layers or the entire bead bed with computer directed ultraviolet or infrared radiation to cure the resin and form a finished green body component; and
removing the finished green body component to a furnace to convert the green body to a ceramic composite.

6. The process of claim 5, wherein the precursor resin is selected from one of a liquid resin and a multiple of different precursor resins.

7. The process of claim 5, wherein the precursor resin is enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

8. A process for forming a finished green body component, in an additive manufacturing system wherein the green body is converted to a ceramic composite, comprising the steps of:
selecting a precursor resin;
converting the precursor resin to beads;
making a paste or gel by mixing the precursor resin beads with a liquid pre-ceramic polymer which is selected from one of a photo curable or a thermally curable polymer;
loading the paste or gel into computer controlled syringes which would deposit the paste or gel in a plurality of layers on a build surface in a selected pattern;
curing each layer by flooding the build chamber with ultraviolet or infrared radiation to cure the resin paste or gel and form a finished green body component; and
removing the finished green body component to a furnace to convert the green body to a ceramic composite.

9. The process of claim 8, wherein the making of a paste or gel, the paste or gel is further mixed with a powder selected from at least one of a metal powder, a carbide powder, a ceramic powder and a mixture thereof.

10. The process of claim 8, wherein the precursor resin is enhanced with a plurality of enhancement particles selected from the group consisting of a metallic powder, a ceramic powder, graphite powder, graphene powder, diamond powder, carbide powder, suicide powder, nitride powder, oxide powder, graphene, carbon nanofiber, carbon nanotubes, and mixtures thereof.

11. A process for forming a finished green body component, in an additive manufacturing system wherein the green body is converted to a ceramic composite, comprising the steps of:
selecting a precursor resin;
converting the precursor resin to beads;
processing un-bonded individual pre-ceramic polymer beads in a furnace to convert the beads to a plurality of individual spherical ceramic beads;
mixing the spherical ceramic beads with a brazing alloy paste to form a spreadable slurry; and
processing the spreadable slurry via Selective Laser Melting (SLM) techniques to produce ceramic-metallic composite components.

12. The process of claim 11, wherein the precursor resin is selected from one of a liquid resin and a multiple of different precursor resins.

13. The process of claim 11, wherein the precursor resin is enhanced with a plurality of enhancement particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

14. The process of claim 11, wherein the spreadable slurry of brazing alloy and spherical ceramic beads is further mixed with a powder selected from at least one of a metal powder, a carbide powder, a ceramic powder and a mixture thereof.

15. The process of claim 14, wherein processing the spreadable slurry with Selective Laser Melting (SLM) produces ceramic-metallic composite components.

16. A process for forming a finished green body component, in an additive manufacturing system wherein the green body is converted to a ceramic composite, comprising the steps of:
selecting a precursor resin;
converting the precursor resin to beads;
processing un-bonded individual pre-ceramic polymer beads in a furnace to convert the beads to a plurality of individual spherical ceramic beads;
mixing the spherical ceramic beads with a glass powder paste to form a spreadable slurry; and
processing the spreadable slurry via Selective Laser Melting (SLM) techniques to melt the glass paste, which, on cooling, produces ceramic-glass composite components.

17. The process of claim 16, wherein the precursor resin is selected from one of a liquid resin and a multiple of different precursor resins.

18. The process of claim 16, wherein the precursor resin is enhanced with a plurality of enhancement particles selected from at least one of a metallic powder, a ceramic powder, graphite powder, graphene powder, diamond powder, carbide powder, silicide powder, nitride powder, oxide powder, graphene, carbon nanofiber, carbon nanotubes, and mixtures thereof.

19. The process of claim 16, wherein the spreadable slurry of glass powder paste and spherical ceramic beads is further mixed with a powder selected from at least one of a metal powder, a carbide powder, a ceramic powder and a mixture thereof.

20. The process of claim 19, wherein processing the spreadable slurry with Selective Laser Melting (SLM) produces ceramic-metallic composite components.

* * * * *